United States Patent
Jain et al.

(10) Patent No.: US 10,650,576 B1
(45) Date of Patent: May 12, 2020

(54) SNAPPING EXPERIENCE WITH CLIPPING MASKS

(71) Applicant: Adobe Inc., San Jose, CA (US)

(72) Inventors: Arushi Jain, Delhi (IN); Bhavna Saluja, New Delhi (IN)

(73) Assignee: Adobe Inc., San Jose, CA (US)

( * ) Notice: Subject to any disclaimer, the term of this patent is extended or adjusted under 35 U.S.C. 154(b) by 59 days.

(21) Appl. No.: 16/186,687

(22) Filed: Nov. 12, 2018

(51) Int. Cl.
| | | |
|---|---|---|
| G06F 17/24 | (2006.01) | |
| G06F 17/20 | (2006.01) | |
| G06T 3/00 | (2006.01) | |
| G06T 15/00 | (2011.01) | |
| G06T 15/30 | (2011.01) | |
| G06F 7/76 | (2006.01) | |
| G06F 40/166 | (2020.01) | |
| G06F 40/131 | (2020.01) | |
| G06T 11/60 | (2006.01) | |
| G09G 5/14 | (2006.01) | |

(52) U.S. Cl.
CPC .............. *G06T 15/30* (2013.01); *G06F 7/764* (2013.01); *G06F 40/131* (2020.01); *G06F 40/166* (2020.01); *G06T 3/0012* (2013.01); *G06T 11/60* (2013.01); *G09G 5/14* (2013.01); *G06T 2200/24* (2013.01); *G06T 2210/12* (2013.01)

(58) Field of Classification Search
CPC ..... G06F 40/131; G06F 40/166; G06T 15/30; G06T 3/0012; G06T 11/60; G06T 2200/24; G06T 2201/12; G09G 5/14
USPC ........................................................ 345/622
See application file for complete search history.

(56) References Cited

U.S. PATENT DOCUMENTS

| 5,926,185 A * | 7/1999 | Vyncke .................. G06T 11/60 345/619 |
| 6,049,390 A * | 4/2000 | Notredame ............ G06K 15/00 358/1.15 |
| 2001/0030655 A1* | 10/2001 | Anwar ................. G06T 15/005 345/630 |
| 2004/0119724 A1* | 6/2004 | Hawksworth ........... G06T 11/60 345/626 |
| 2004/0227772 A1* | 11/2004 | Huang .................... G06T 11/40 345/622 |
| 2015/0149897 A1 | 5/2015 | Cheong et al. |
| 2016/0150126 A1* | 5/2016 | Gnutzmann ....... G06K 15/1826 358/3.27 |
| 2017/0278216 A1 | 9/2017 | Milan et al. |

* cited by examiner

Primary Examiner — Jin Cheng Wang
(74) Attorney, Agent, or Firm — Brake Hughes Bellermann LLP

(57) ABSTRACT

Techniques are described for identifying a plurality of objects associated with a clipping mask and available for display in a user interface of a digital media editor, identifying, for each of the plurality of objects, a bounding box surrounding a respective object in the plurality of objects, each bounding box defining a plurality of anchor points configured to generate alignment guides for the respective object. The techniques may also includes determining, for each object, visible portions that are within a boundary defined by the clipping mask, determining a plurality of locations in which at least one bounding box intersects with the clipping mask within the visible portions, and triggering, in the user interface, modification of the at least one bounding box in at least one of the plurality of locations to reduce the at least one bounding box to terminate on at least one of the plurality of locations.

20 Claims, 9 Drawing Sheets

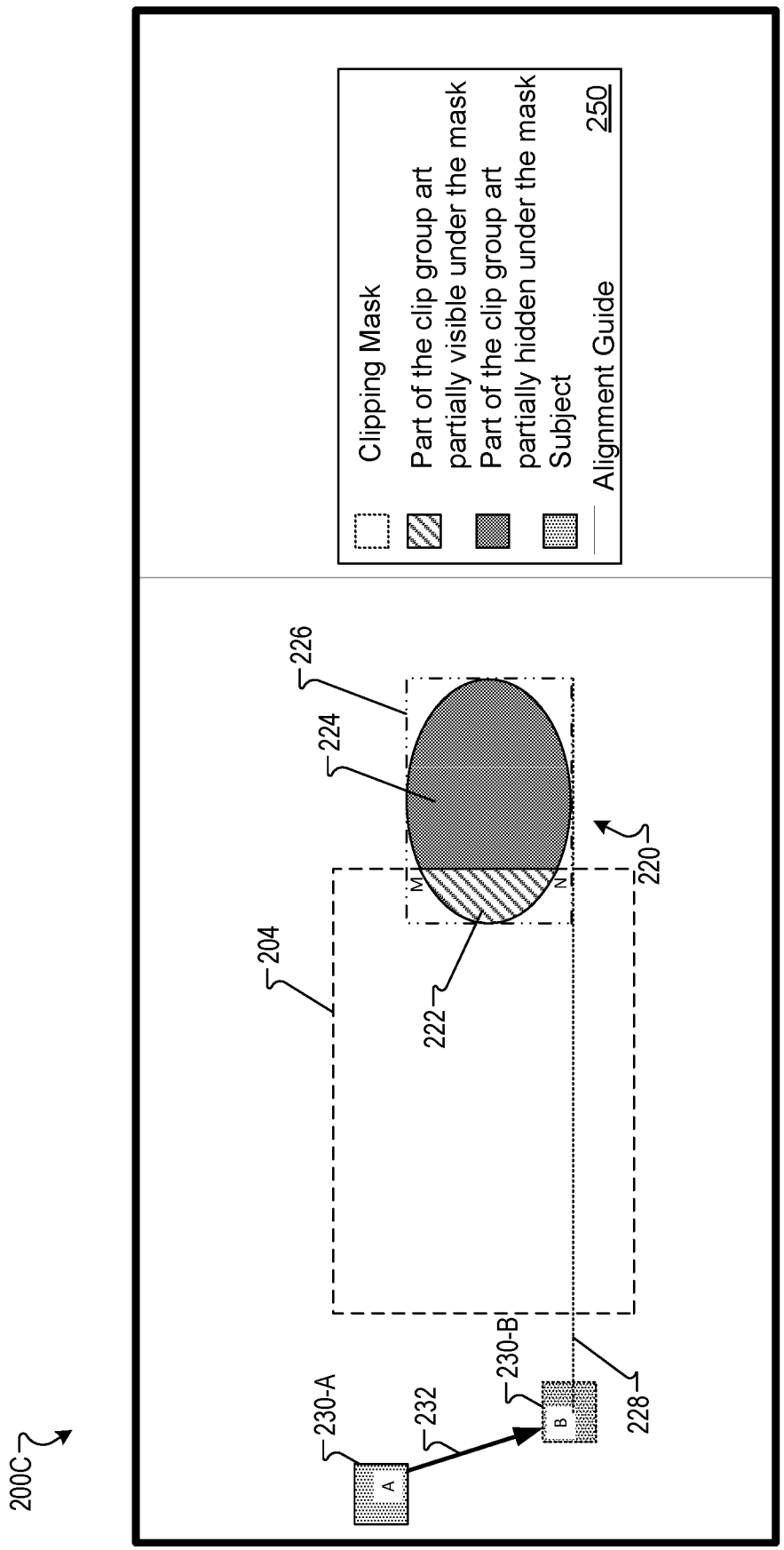

SNAPPING EXPERIENCE WITH CLIPPING MASKS

TECHNICAL FIELD

This description relates to snapping of vector graphics when used in combination with clipping masks.

BACKGROUND

Image processing applications may be used to generate and edit images. Such applications can provide a number of tools to assist users in creating image content. The tools may allow image content to be edited and moved within the application. One example of such a tool may be referred to as a clipping mask.

A clipping mask may represent an object having a shape that masks other artwork/objects such that the areas that lie within the shape are visible which, in effect, clips artwork to the shape of the mask. The clipping mask and the objects that are masked may constitute a clipping group. Clipping masks may be generated for particular images for use when combining those images with other images to generate combined image content. However, it may be difficult to obtain a visually pleasing combined image, as the user may not visually evaluate the aesthetic qualities of a particular snapping together of images until the placement is complete. Thus, providing tools to modify and adapt features associated with images may be helpful to users attempting to combine such images.

Traditionally, an image processing application may provide techniques that utilize alignment guides and clipping masks. However, such techniques may have certain inaccuracies. For example, in conventional systems, combining images may be performed by connecting together large outer bounding boxes that surround each image. However, the large outer bounding boxes may not properly represent the shape and content within the images and may be cumbersome for a user wishing to connect the images in a precise way. Using default bounding boxes associated with an image can lead to inaccurate combining and/or connecting of images. A further issue with utilizing a default bounding box associated with a particular image (or content) includes the unwanted provision of a connectable bounding box defined for a portion of the image that is hidden or not defined within a particular clipping mask. This may cause frustration to a user that does not wish to connect to hidden portions of the image.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method includes identifying a plurality of objects associated with a clipping mask and available for display in a user interface of a digital media editor, identifying, for each of the plurality of objects, a bounding box surrounding a respective object in the plurality of objects, each bounding box defining a plurality of anchor points configured to generate at least one alignment guide for the respective object. The method also includes determining, for each object, visible portions that are within a boundary defined by the clipping mask, determining a plurality of locations in which at least one bounding box intersects with the clipping mask within the visible portions, and triggering, in the user interface, modification of the at least one bounding box in at least one of the plurality of locations. The modification may include reducing the at least one bounding box to terminate on at least one of the plurality of locations. Other embodiments of this aspect include corresponding computer systems, apparatus, and computer programs recorded on one or more computer storage devices, each configured to perform the actions of the methods.

Implementations may include one or more of the following features. The method may include determining hidden portions that are located outside of the boundary defined by the clipping mask and disabling, for each bounding box determined to include hidden portions of the plurality of objects, anchor points that are associated with the hidden portions of the plurality of objects. Disabling the anchor points that are located within the hidden portions may include changing a size of each bounding box that includes both visible portions and hidden portions to reduce an area covered by each respective bounding box.

Implementations may further include modifying the at least one bounding box to remove snap-to functionality for the hidden portions and suppressing display of alignment guides associated the hidden portions in the user interface. In some implementations, at least one of the plurality of locations is located on a geographic feature represented in at least one of the plurality of objects and the plurality of objects represent vector graphic art. In some implementations, all anchor points and alignment guides associated with at least one object in the plurality of objects may be disabled, in response to determining that the at least one object is undefined by the clipping mask.

Implementations may further include enabling at least one anchor point for each of the plurality of locations in the visible portions and disabling at least one anchor point based on the determined intersection of the clipping mask and the at least one bounding box. Implementations may further include determining the plurality of locations includes determining, for each visible portion, a center anchor point, a top left anchor point, and a bottom right anchor point, and the determined plurality of locations may be used to generate the modification of the at least one bounding box. In some implementations, the at least one alignment guide is generated by displaying a graphical line, in the user interface, that intersects at least one anchor point in the plurality of anchor points, in response to detecting a subject within a predetermined proximity of the at least one anchor point. The graphical line may be configured to align the subject to other content within the user interface of the digital media editor to allow linking of the subject to the other content at the at least one anchor point. Implementations of the described techniques may include hardware, a method or process, or computer software on a computer-accessible medium.

In another general aspect, a computer program product embodied on a non-transitory computer-readable storage medium is described. The computer-readable storage medium includes instructions that, when executed by at least one computing device, are configured to cause the at least one computing device to identify a plurality of objects associated with a clipping mask and available for display in a user interface of a digital media editor, identify, for each of the plurality of objects, a bounding box surrounding a respective object in the plurality of objects, each bounding box defining a plurality of anchor points configured to generate at least one alignment guide for the respective object, determine, for each object, visible portions that are within a boundary defined by the clipping mask, determine a plurality of locations in which at least one bounding box intersects with the clipping mask within the visible portions, and trigger, in the user interface, modification of the at least one bounding box in at least one of the plurality of locations, the modification including reducing the at least one bounding box to terminate on at least one of the plurality of locations.

In some implementations, the instructions may further include determining hidden portions that are located outside of the boundary defined by the clipping mask and disabling, for each bounding box determined to include hidden portions of the plurality of objects, anchor points that are associated with the hidden portions of the plurality of objects. In some implementations, disabling the anchor points that are located within the hidden portions includes changing a size of each bounding box that includes both visible portions and hidden portions to reduce an area covered by each respective bounding box. In some implementations, at least one of the plurality of locations is located on a geographic feature represented in at least one of the plurality of objects and the plurality of objects represent vector graphic art. In some implementations, determining the plurality of locations includes determining, for each visible portion, a center anchor point, a top left anchor point, and a bottom right anchor point. The determined plurality of locations may be used to generate the modification of the at least one bounding box. Implementations of the described techniques may include hardware, a method or process, or computer software on a computer-accessible medium.

In another general aspect, a media editing system for arranging objects in an electronic document is described. The system may include a display device, at least one input device to move objects within the electronic document, at least one alignment control to control attraction of a plurality of anchor points associated with objects, at least one memory including instructions and at least one processor that is operably coupled to the at least one memory and arranged and configured to execute instructions that, when executed, cause the at least one processor to provide the objects in a user interface of a digital media editor, wherein at least one of the objects is defined by a clipping mask, receive, from the input device, at least one input associated with a first object, the at least one input including selection and movement of the first object toward a second object, identify, for the second object, a bounding box that surrounds the second object, the bounding box defining a plurality of anchor points configured to generate at least one alignment guide for the second object, determine, for the second object, visible portions of the second object that are within a boundary associated with the clipping mask, determine a plurality of points of interest in which at least one bounding box intersects with the clipping mask within the visible portions, and modify the at least one bounding box in at least one of the plurality of points of interest. The modification may include reducing the at least one bounding box to terminate on at least one of the plurality of points of interest.

In some implementations, the system may determine hidden portions that are located outside of the boundary defined by the clipping mask and disable, for each bounding box determined to include hidden portions of the objects, anchor points that are associated with the hidden portions of the objects. The objects may be represented as vector graphic art. In some implementations, disabling the anchor points that are located within the hidden portions includes changing a size of each bounding box that includes both visible portions and hidden portions to reduce an area covered by each respective bounding box.

In some implementations, the system may include enabling at least one anchor point for each of the plurality of points of interest in the visible portions and disabling at least one anchor point based on the determined intersection of the clipping mask and the at least one bounding box. In some implementations, determining the plurality of points of interest includes determining, for each visible portion, a center anchor point, a top left anchor point, and a bottom right anchor point, and wherein the determined points of interest are used to generate the modification of the at least one bounding box. In some implementations, the at least one alignment guide is generated by displaying a graphical line, in the user interface, that intersects at least one anchor point in the plurality of anchor points, in response to detecting a subject within a predetermined proximity of the at least one anchor point, the graphical line configured to align the subject to other content within the user interface of the digital media editor to allow linking of the subject to the other content at the at least one anchor point.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIG. 2C is an example user interface illustrating partially visible content under a clipping mask.

DETAILED DESCRIPTION

Figure 1:
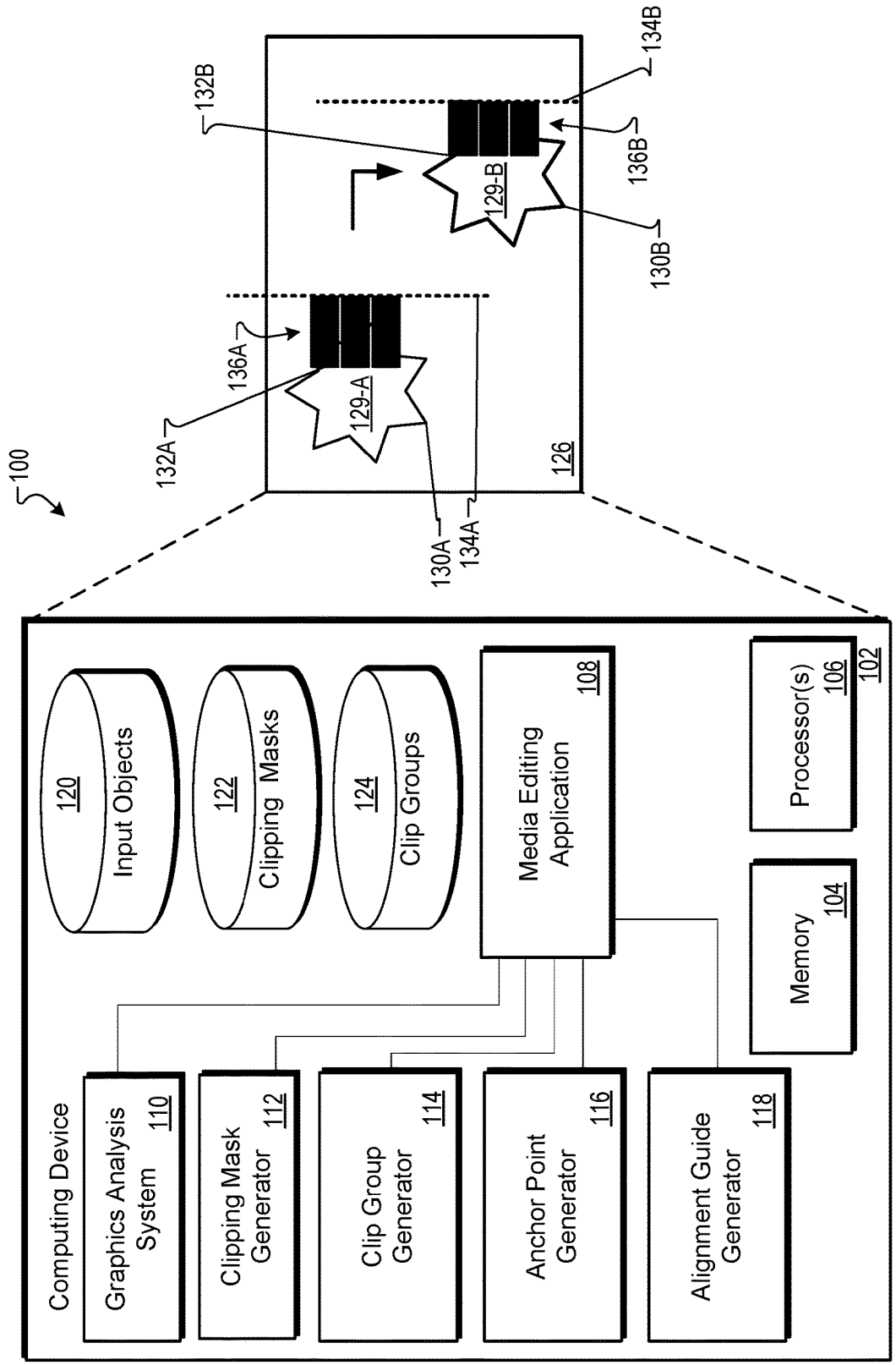
FIG. 1 is a block diagram of a system for performing the techniques described herein.

While many image and vector graphics processing applications provide alignment guides and clipping masks, the systems and techniques described herein may utilize such guides and masks with modifiable bounding boxes and other content features to improve the accuracy and precision with which users/designers use alignment guides for combining document content (e.g., vector artwork/graphic objects, images, video, characters, and/or other document content). In some implementations, the systems and techniques described herein may use clipping masks, alignment guides, and bounding boxes for intelligently extracting and combining selected portions of vector graphic objects, images, and/or textual elements resulting in an improved user experience when working with such objects defined by clipping masks.

In addition, the systems and techniques may provide an improved snapping mechanism that ensures that users can generate combined vector graphic content in an intuitive and accurate fashion and at specific (and typically undefined locations) on objects (e.g., vector art content). For example, users may use configurable bounding boxes and clipping masks that are partially hidden and/or that include portions of one or more portions of the content that is not included within a boundary associated with a particular clipping mask.

Without the techniques described herein, object alignment guides may be shown with respect to a bounding box associated with an entire object (e.g., vector graphic) instead of a bounding box associated with a visible region of the object. The systems and techniques described herein can enable the user to align a subject (e.g., a user-selected object) with the specific object in the above example with the visible portions of the object that are also inside the clipping mask (or clip group) while disabling the ability to align or snap-to the hidden portions of the object and/or portions of the object outside the clip group. Disabling snapping with hidden portions/regions may provide the advantage of providing an intuitive user experience such that hidden portions do not provide irrelevant snapping guides that simply provide guides that the user may not wish to view. For example, disabling or suppressing snapping/alignment guides may save the user from having to zoom in and out of particular views to ensure that particular guides are not provided in a view.

In general, this document describes systems and techniques that may be used to generate, edit, and arrange content in an electronic document in a media editing application. The content may include, but is not limited to objects, vector art/graphics, images, video, characters, artwork, and/or other document content available to be accessed in a media editing application (e.g., image/vector art processing application). The systems and techniques described herein can utilize and manipulate bounding boxes, alignment guides, and clipping masks available in such media editing applications to intelligently snap together selected content, for example, with other document content.

As used herein, snapping content together may include the linking (i.e., connecting of) a subject to an object within a user interface. The subject may represent a selectable element (e.g., artwork, objects, graphics, images, video, characters, and/or other document content), that may be moved in a direction toward other elements (e.g., artwork, objects, graphics, images, video, characters, text, and/or other document content) within a user interface. The other elements within the user interface may be represented as the object in which the subject may snap together (i.e., snapping, snap-to, snapped, linked, connected, etc.). In some implementations, objects may include or be associated with anchor points, bounding boxes, and/or alignment guides. When a user moves a subject toward an object, one or more anchor points, bounding boxes, and/or alignment guides may be presented in the user interface (e.g., displayed to a user) of the media editing application to guide the user with snapping content together.

Snapping the subject to the object may result in generating combined content (e.g., vector art). In general, the object may be associated with a clipping mask. Clipping masks may be used to define portions (and layers) of one or more images that are to remain visible when layered (e.g., stacked) with one or more other images or document content.

Vector art (e.g., vector art graphics), as used herein, may refer to computer graphics images that are defined in terms of two-dimensional points, which may be connected by lines and/or curves to form polygons and other shapes. In some implementations, vector graphics may include paths, defined by start and end points as well as points, curves and other angles between the start and end points.

A clipping mask, as used herein, may include a boundary perimeter (e.g., clipping path) with a shape, selected according to user settings and/or system settings, that masks other artwork/objects so that areas that lie within the shape are visible. The user settings and/or system settings may be predefined, defined on the fly, or defined after generation of content (e.g., vector art, objects, images and/or after generation of layers of content). In operation, the clipping mask may be used to define a region within a clipping path. The region can be copied and pasted into other images, documents, other clipping masks, etc. A clip group may be defined using a clipping mask and any content (e.g., objects, vector art, etc.) that is defined (e.g., clipped) by the clipping mask. As used herein, a clip group may represent at least one clipping mask and any associated clipped contents pertaining to the defined clipping mask.

The clipping masks described herein may be any definition of a border (e.g., contours of any shape) of an image, vector graphic, artwork, or other document content. In some implementations, the clipping mask represents a contour or graphical path in vector form. The vector may be included as part of a particular object to define particular boundaries, alignment rules, and/or other object behavior.

In general, the clipping path of a clipping mask may be represented as a vector object. The objects below the clipping mask may be any content including, but not limited to vector graphics, artwork, raster photos, a vector drawings, line drawings, etc. In operation, a clipping mask can be used to allow users to move multiple layers of content around within a media editing application. For example, a graphic designer may generate clipping masks for particular graphics content so that new combined graphics content can be generated by layering a number of graphics and extracting particular areas of interest out of one or more of the layers of graphics.

The systems and techniques described herein may utilize such guides and masks with modifiable bounding boxes to improve the accuracy of combining document content. For example, in conventional systems, snapping around clip groups may include provision of a large outer bounding box that surrounds particular content or a mask that does not accurately represent the shape of the clip group. This can lead to inaccurate snapping of vector graphics to content that is clipped under the clipping mask, but is invisible or unintended for use with particular objects of interest to a user.

The systems and techniques described herein can define clipping masks using one or more anchor points associated with portions of document objects and/or document content. In particular, anchor points associated with portions of content may be defined by the systems and techniques described herein for visible content within boundaries of a particular clipping mask. In addition, the anchor points associated with visible content may be defined as active while anchor points (and/or alignment guides) for invisible portions of document objects and/or document content may be rendered inactive. This can provide an advantage of accurate alignment guides and anchor point graphical user interface elements for document content that is likely of interest to a user accessing the content while suppressing alignment guides and anchor point graphical user interface elements for document content that is deemed less likely of interest to the user (or content that includes portions of invisible content). Such an advantage can ensure that a clean user interface is provided to a user attempting to snap content together.

The anchor points, as used herein, may be a graphical element within an electronic document that represents attraction locations in which document content can be snapped to. An anchor point may trigger snapping when particular content (e.g., vector art/graphics, objects, images, text, etc.) is placed within a threshold distance from the anchor point. Snapping a portion of a vector graphic to other content may represent a link between the portion of the vector graphic to the other content at the anchor point.

The systems described herein may snap vector graphics and/or content together by utilizing anchor points defined for bounding boxes associated with particular graphics and/or content. For example, alignment tools (e.g., bounding boxes and alignment guides) and clipping masks may be used to define convenient snapping locations (e.g., anchor points) that may be used to improve the accuracy of how the graphics and/or content are combined and thus, improve the visual understanding for how a resulting graphic will appear to a user. In some implementations, the systems described herein may be programmed to modify alignment tools (e.g., bounding boxes, alignment guides) based on one or more clipping masks to allow for snapping within clip groups (of document content) in a consistent and intuitive way for a number of media editing applications.

In some implementations, the systems and techniques described herein can be used to modify alignment guides and/or bounding boxes to support snapping of visible regions of particular objects (e.g., within vector graphics) under a clipping mask, while suppressing provision of an alignment guide or anchor point that would result in allowing a user to snap content to an invisible or partially visible region of the objects under the clipping mask. In some implementations, the systems and techniques described herein can redefine the alignment guide, bounding box, and/or anchor point associated with particular clipping masks rather than suppressing the display of the alignment guide, bounding box, and/or anchor point. For example, the systems described herein can identify the bounds of a partially visible region of one or more objects inside a clip group. Providing clipping masks, alignment guides, and/or anchor points for document content within a boundary can ensure that users may snap document content to other document content within the boundary (e.g., visible regions of an object) while disabling snapping of document content outside of the boundary. Thus, a user may align underlying visible content (e.g., vector graphics) to the clipping mask with ease. Conventional systems may instead default to allow snapping of all content (including invisible content or content outside of the boundary defined by the clipping mask), which may result in misalignment of content in a particular clip group.

FIG. 1 is a block diagram of a system 100 for performing the techniques described herein. In particular, system 100 may provide consistency in content snapping for media editing systems. The system 100 can provide such consistency by using clipping masks to generate snapping framework (e.g., alignment guides) that are based on the actual shapes of document content and/or objects being aligned, snapped, and/or edited. The system 100 may provide snapping with clip groups using such alignment guides to provide intuitive editing of graphics and objects in the document content.

As shown in FIG. 1, the system 100 includes a computing device 102 having at least one memory 104, at least one processor 106, and at least one media editing application 108. The system 100 also includes one or more systems and/or algorithm modules, such as graphics analysis system 110, clipping mask generator 112, clip group generator 114, anchor point generator 116, and alignment guide generator 118.

The computing device 102 may communicate with one or more other computing devices, over a network (not shown). The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network or plurality of networks.

In some implementations, the computing device 102 is a client device. Device 102 may be communicably coupled to one or more other devices (not shown) via wireless, wired, or other networked connection. In some implementations, the computing device 102 is a server device that provides output to a number of client devices operating instances of media editing application 108, for example.

The processor 106 may represent two or more processors on the computing device 102 executing in parallel and utilizing corresponding stored instructions using memory 104. In some implementations, the at least one processor 106 may be a specialized processor, e.g. a graphics processing unit (GPU). The memory 104 may represent a non-transitory computer-readable storage medium. Similarly, the memory 104 may represent one or more different types of memory utilized by the computing device 102. In addition to storing instructions, which allow the at least one processor 106 to implement disclosed embodiments, the memory 104 may be used to store data, such as input objects 120, clip masks 122, and/or clip groups 124. The memory 104 may also be used to store processes, systems, and modules, such as graphics analysis system 110, clipping mask generator 112, clip group generator 114, anchor point generator 116, and alignment guide generator 118.

In operation, the system 100 may identify all objects (e.g., vector graphics, artwork, images, text, content, etc.) in a predefined environment in which to snap to a selected subject (e.g., vector graphics, artwork, other objects, graphics, images, video, characters, and/or other document content). From the identified objects, the system 100 can identify a visible region in which snapping will be allowed (e.g., enabled). In addition, system 100 can identify a non-visible region (e.g., hidden region) or other regions in which snapping will be disallowed. Thus, users accessing any of the regions to generate and edit graphics (e.g., vector graphics) within documents may be provided a simplified alignment user interface in which extraneous alignment guides, extraneous anchor points, and extraneous snapping behavior is removed from view.

In some implementations, removing the extraneous alignment guides, anchor points, and or snapping behavior from view also triggers removal of functionality of such elements. In some implementations, the system 100 modifies the placement and or functionality of the extraneous alignment guides, anchor points, and/or snapping behavior. For example, an alignment guide (or associated bounding box) may be shortened, lengthened, relocated, tilted, and/or split, etc. Similarly, anchor points may be relocated, tilted, removed, and/or split, etc.

Identifying all objects in a predefined environment in which a selected subject may be snapped to may include identifying all anchor points associated with all visible objects in a particular clip group. For example, the system 100 may utilize graphics analysis system 110 to determine, for each object present in a visible area (2D) or volume (3D) of the environment, whether the object belongs to a clip group. If the art is part of a clip group, the graphics analysis system 110 can assign a clipping mask to the clip group using clipping mask generator 112. For each clipped object within the clipping mask, the graphics analysis system 110 may generate a vector of interesting points with in the object according to the clipping mask and the objects associated with the clipping mask. If the art is not part of a clip group, the graphics analysis system 110 can retrieve points of interest of other objects in the environment by enumerating bounding box points of the objects, for example. Points of interest may pertain to perimeters, peaks, valleys, endpoints, center points, or other point that can be gleaned from user interaction and object shape.

Upon completion of analyzing the objects, the system 100 may generate a snapping point list (e.g., of updated anchor points) for each point of interest associated with the objects in the environment. The snapping point list may be added to a snapping module (e.g., anchor point generator 116) for each object to ensure that at least one snap line (e.g., alignment guide) is enabled to be generated from a respective new anchor point upon detecting a subject is within a predefined proximity of the respective new anchor point. The graphics analysis system 110 may utilize clipping mask generator 112 to update clipping masks with updated anchor points and/or alignment guides. Similarly, the graphics analysis system 110 may utilize anchor point generator 116 and alignment guide generator 118 to invoke the updated anchor points and the alignment guides according to the snapping point list and based on the determined points of interest.

In some implementations, the system 100 may use clipping masks to determine which particular objects can be snapped to (or which objects may generate alignment guides). For example, the system 100 may provide objects for display in a user interface 126 of a digital media editor (e.g., via media editing application 108). The graphics analysis system 110 can identify objects associated with a particular clipping mask 122 and can then determine points of interest. For example, the graphics analysis system 110 can use the clipping mask 122 and an associated clip group to determine at least a center location, a top left location, and a bottom right location for visible portions of a bounding box associated with each object depicted in the user interface. The locations may represent anchor points and/or may define perimeter locations of the bounding box.

If the object is determined to be within a boundary associated with (or defined by) a particular clipping mask, the points of interest may be defined by the bounding box points. That is, since the bounding box is within the clipping mask and visible, the points of interest may be deemed valid for a user to connect content to the object and thus, the system 100 may forego updating the snapping point list for that particular object.

If the object is determined to be outside of the boundary associated with (or defined by) the clipping mask, the graphics analysis system 110 may retrieve locations (i.e., a clipping path) associated with the clipping mask, retrieve locations associated with the bounding box of the object and perform a comparison to determine whether any overlap occurs between the locations associated with the clipping mask and the locations associated with the bounding box of the object. If the graphics analysis system 110 determines overlap for all locations, the object may be considered as visible and the original anchor points (e.g., points of interest) associated with the anchor points and alignment guides associated with the object may be enabled (or remain functional) if, for example, a user moved a subject within a predefined proximity of the object.

If the graphics analysis system 110 determines overlap for some of the locations, the object may be considered partially visible and partially hidden. In such an example, the system 100 may determine a modified bounding box for the object utilizing the overlap, as described in detail in FIGS. 3A-3B.

If the graphics analysis system 110 determines overlap for none of the points, the object may be considered outside of the clipping mask. In such an example, the system 100 may remove the object from being a candidate to be snapped to the subject.

In some implementations, the graphics analysis system 110 may determine intersections amongst objects in the user interface 126 by determining bounding boxes for a clip group of objects and determining bounding boxes for each object within the clip group. The graphics analysis system 110 may utilize pixel maps (via inverse perspective mapping techniques) to determine such intersections and/or overlapping of objects with other objects, clipping masks, bounding boxes, etc.

The media editing application 108 can be any editor capable of allowing vector drawing. As used herein, vector drawing can include two-dimensional and three-dimensional vector drawing. Media editing application 108 can be any suitable digital media editor configured to edit vector drawings. Examples of digital media editor can include ADOBE® Illustrator, ADOBE® Photoshop, ADOBE® InDesign (all available from Adobe Systems, Inc. of San Jose, Calif.), or any other suitable digital media editor.

A user may access the media editing application 108 on device 102. The media editing application 108 may provide analysis of vector graphics and document content using the graphics analysis system 110. For example, the graphics analysis system 110 may be implemented with at least one computing device configured to process graphics within electronic documents.

The graphics analysis system 110 may also generate saliency maps and gradient maps for each image or graphic for use with the clipping masks associated with a particular image or graphic. For example, the saliency map of an image or graphic may depict each pixel in the image to represent changes throughout the image or graphic. The saliency map can be used to determine particular areas of interest within an image or graphic (e.g., edges, dark or light portions, intensity, texture, etc.). In some implementations, the saliency map of an image or graphic is a representation of which portions of the image or graphic are prominent, striking, or stand out relative to neighboring portions in the image. The gradient map of an image or graphic is a representation of directional change of intensity or color in the image or graphic. The gradient map may indicate where edges are located within the image or graphic. Both the saliency map and the gradient map of an image or graphic may be utilized by the system 100 to determine candidate locations for alignment guides, anchor points that correlate to the clip groups 124 and/or clipping masks 122.

In operation, a user may access the media editing application 108 to generate and edit objects (e.g., graphics, images, document content, etc.) having one or more clipping masks 122 using the clipping mask generator 112. A clipping mask 122 may represent an object with a shape that masks other artwork/document content so that the areas that lie within the shape are visible while areas that lie outside of the shape are hidden.

In some implementations, the clipping mask may be used as a guide to clip the artwork/document content to the shape of the mask for a particular clip group. For example, the clipping mask generator 112 may automatically detect content (e.g., vector graphics) to generate a clipping mask. In some implementations, a user can utilize an input device and the algorithms available in clipping mask generator 112 to manually place a clipping path that results in a defined clipping mask for the content. The clipping mask (and associated clip group) generated using system 100 can be configured by any number of entities including third-party modules, stand-alone applications, web services, and or the media editing application 108.

In general, the clipping masks 122 (and clip groups 124) may be in vector form when generated and associated with one or more particular vector graphic. The systems described herein can utilize the vector to generate graphical output consistent with data in the vector when the vector graphic is displayed for view in the media editing application 108. The clipping mask 122 and the objects and/or content that are masked may represent a clip group 124. Clip groups 124 can be generated from a selection of two or more objects and/or document contents or from all objects associated with a particular project.

The media editing application 108 may generate clip groups 124 using the clip group generator 114. For example, the clip group generator 114 may be accessed by a user to trigger objects and/or content to be grouped. For example, a vector graphic or set of vector graphics can be grouped with a number of layers. Each layer may define a different attribute for the graphic or set of graphics. For example, an object-level clip group may include the object (e.g., graphic) on a top layer and that layer may clip all objects beneath the object. In some implementations, operations performed on an object-level clip group (e.g., transformations, alignment) are based on a boundary associated with the clipping mask. In some implementations, the clipping mask generator 112 may function to generate a clipping mask that is used to generate an area of interest, for example.

The media editing application 108 may generate anchor points for particular document content using the anchor point generator 116. For example, locations 130A, 130B, 132A, and 132B may represent anchor points with control handles that may be used to control a direction of snapping to particular objects (e.g., vector graphics). Anchor points may be selected, snapped to, and/or moved using anchor point generator 116. In some implementations, an anchor point may engaged (by selection or proximity to document content) and such an engagement may trigger one or more alignment guides 134A to be depicted in the user interface 126, for example. The alignment guide 134A may assist a user in placing content (e.g., graphics) within the user interface 126 of the media editing application 108.

The media editing application 108 may generate and/or update alignment guides (e.g., alignment guide 134A and alignment guide 134B) using the alignment guide generator 118. Alignment guides may represent temporary snap-to guides that appear when a user creates or manipulates graphics, objects, artboards, artwork, or other document content within media editing application 108. In general, alignment guides may help a user align, edit, and transform such content relative to other content. In some implementations, the alignment guides may display a graphic (e.g., a line or shape) along content and may display an X, Y location with delta values. In some implementations, other feedback may be depicted with an alignment guide including, but not limited to measurement labels, object highlighting, or user-defined content. In some implementations, the alignment guide 134A may updated to alignment guide 134B if, for example, system 100 determines that a portion of an object is hidden. For example, the system 100 may determine the visible portions of element 136A and determine that portions of element 136A are not visible and/or not within a defined clipping mask. Thus, the alignment guide 134A may be moved/updated to a location shown at alignment guide 134B to provide a guide for visible portions, as shown by guide 136B.

Each element 108-118 may have access to memory 104, processors 106, objects 120, clipping masks 122, and/or clip groups 124. The objects 120, clipping masks 122, and/or clip groups 124 may be user-defined, user-generated, imported from other media, and/or system generated by the systems described herein.

In operation, a user may access media editing application 108 to be provided a user interface, such as the user interface 126. The media editing application 108 may be accessed by a user to generate, edit, or otherwise modify vector graphics, document elements, clipping masks, and/or image content. For example, a user may generate or upload a number of images and/or document content. The user can generate a clipping mask using the clipping mask generator 112. The clipping mask may include a clipping path (representing a boundary line) having a specific shape in accordance with user settings or predetermined settings.

The clipping path may be used to snap any subject (e.g., graphics content that a user has selected and/or moved) to other content or clipping mask portions. For example, to snap any subject (e.g., vector graphic, image, document content, objects, etc.) to a portion of a clipping mask, the system 100 may provide alignment guides, anchor points, and algorithmic rules, as described throughout this disclosure. In some examples, the user may use the system 100 to snap any subject (e.g., vector graphic, image, document content, etc.) to a portion of a clipping mask, content in a clip group, content outside of the clip group, and/or content partially visible inside the clip group. The following describes examples of providing improved snapping of document content using snapping masks.

Figure 2A:
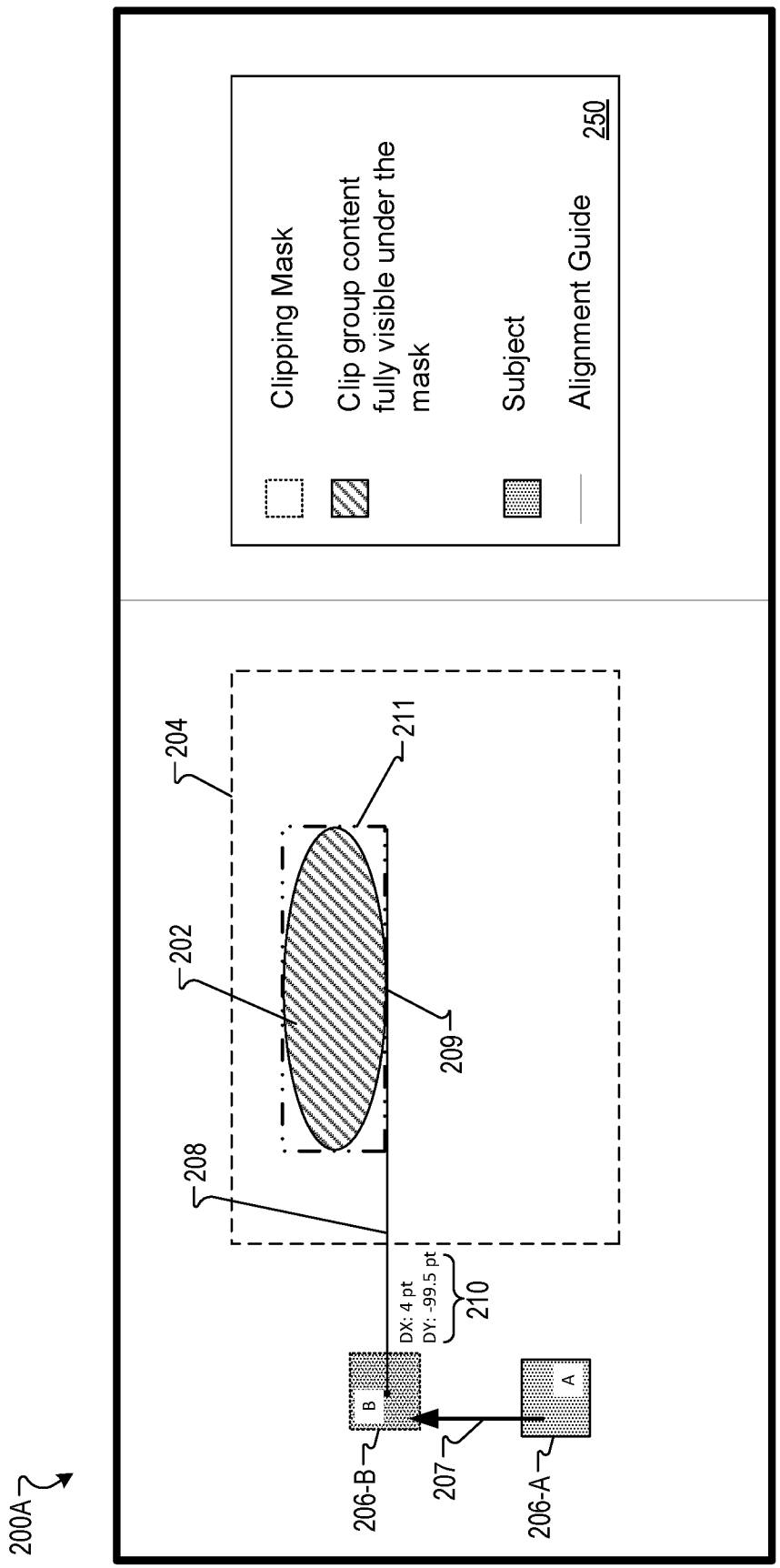
FIG. 2A is an example user interface illustrating content visible under a clipping mask.

FIG. 2A is an example user interface 200A illustrating content 202 associated with a clipping mask 204. Although only one content item (e.g., object) is depicted in the example, any number of objects, text, graphics, images, and/or other content may be provided. In this example, a user may use an input device (not shown) to move a subject 206-A from a first location [A] to a second location [B] (e.g., subject 206-B), as indicated by arrow 207. When the subject 206-A is moved from the first location [A] to the second location [B], an alignment guide 208 is provided to indicate that snapping of the subject 206-B with clip group objects may occur with the full bounding box 211 of at least one fully visible object (e.g., vector graphic 202) within a particular clip group. The bounding box 211 is shown as a rectangular border around an object (e.g., graphic, shape, or text) that can be used by an input device to drag to move, transform, rotate, or scale the object within a user interface.

The snapping of subject 206-B to an object (e.g., content 202) may occur at location 209 on alignment guide 208. Because the entire contents of the clip group (e.g., content 202) is visible under the clipping mask, an alignment guide may be triggered to be provided to connect to any portion of content 202, as the subject 206-A is moved around within the user interface 200A. As shown, the [X, Y] coordinates 210 may also be provided for the alignment guide 208.

For clarity, a legend 250 is shown depicting any number of graphical indicators for document content including any number of clipping masks, clip group content, subjects, hidden objects, partially visible, partially invisible, and/or alignment guides. In some implementations, the legend 250 is not shown in any of the user interfaces of the media editing applications 108.

Figure 2B:
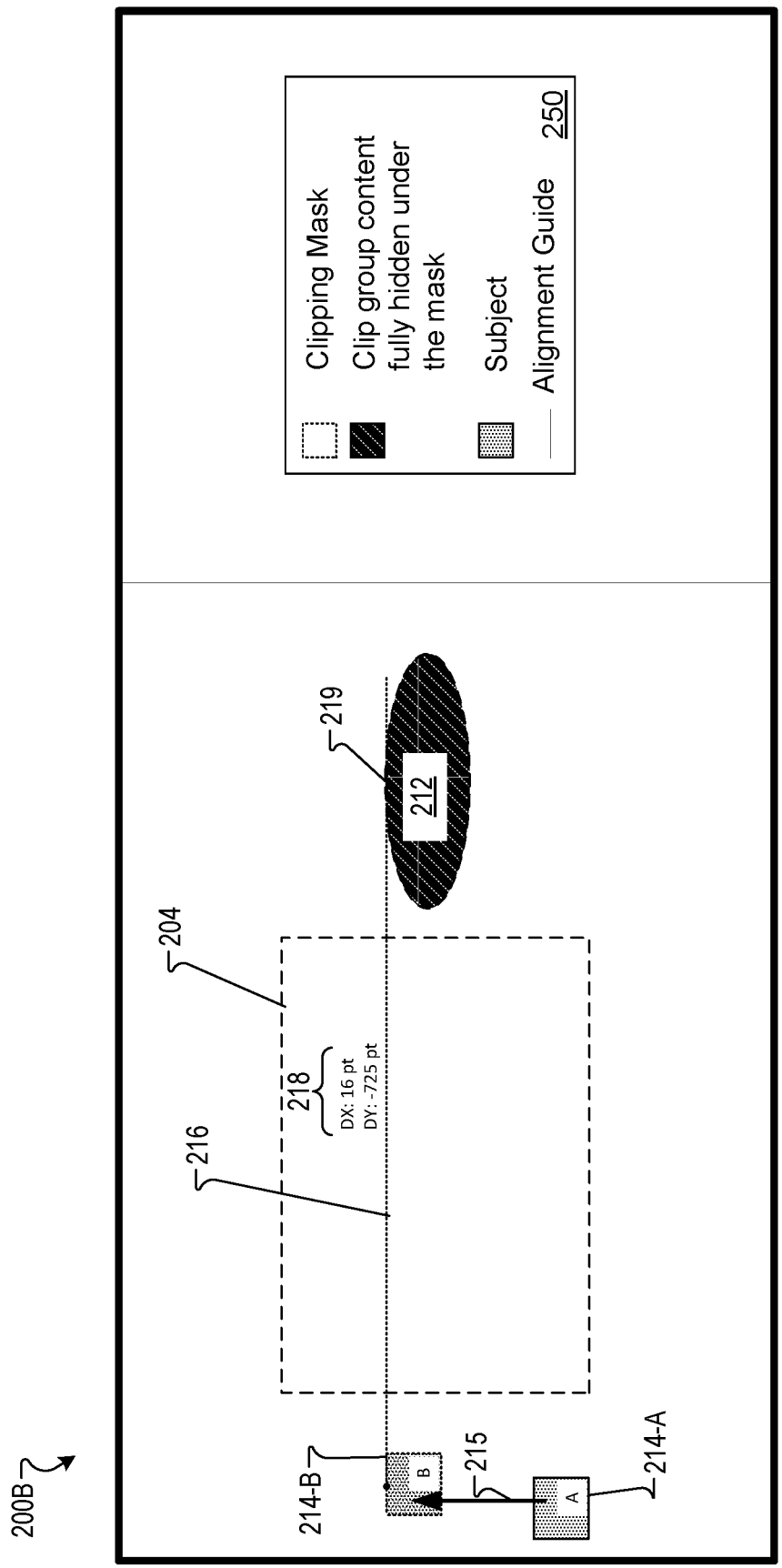
FIG. 2B is an example user interface illustrating hidden content clipped by a clipping mask.

FIG. 2B is an example user interface 200B illustrating hidden content 212 clipped by the clipping mask 204. Although only one content item (e.g., object) is depicted in the example, any number of vector graphics, objects, text, images, and/or other document content may be provided. In this example, a user may use an input device (not shown) to move a subject 214-A from a first location [A] to a second location [B] (e.g., shown by subject 214-B), as indicated by arrow 215. Unlike the systems and techniques described herein, conventional systems may provide the alignment guide 216 and corresponding [X, Y] coordinates 218 to allow the user to snap the subject 214-B to the hidden content 212 at location 219, for example. However, the system 100 may instead suppress the alignment guide 216 because the content 212, while clipped to the clipping mask 204, is still hidden (e.g., invisible under the mask) and likely an unintended target in which to snap to subject 214-B. For clarity, the legend 250 is shown to differentiate the elements in the user interface 200B.

The algorithms described herein may be configured to suppress alignment guides and anchor points associated with hidden content to provide the user with alignment guides that take into account hidden content in order to suppress extraneous functionality associated with guides and anchor points associated with hidden content. In some implementations, a user may apply a hidden attribute to particular vector graphics, objects, images, and/or document content to ensure that snapping functionality (i.e., anchor points and alignment guides) are not provided in the user interfaces described herein.

FIG. 2C is an example user interface 200C illustrating partially visible content 220 associated with the clipping mask 204. For clarity, the legend 250 is shown to differentiate the elements in the user interface 200C. Although only one content item (e.g., object) is depicted in the example, any number of vector graphics, objects, text, images, and/or other document content may be provided.

Figure 2D:
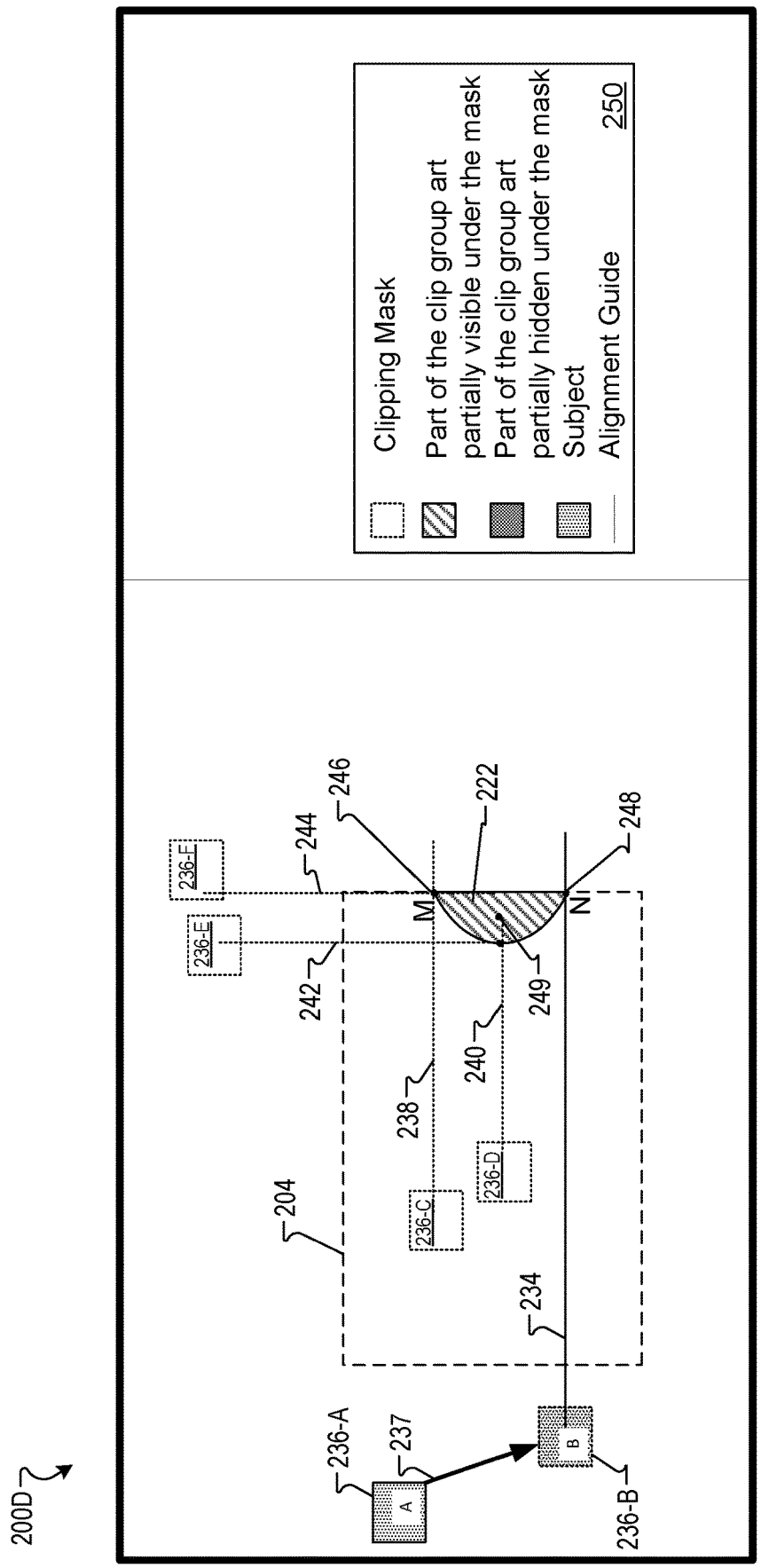
FIG. 2D is an example user interface illustrating an example alignment guide associated with the partially visible content of FIG. 2C.

In the depicted interface 200C, a visible portion 222 of content 220 includes a partially visible oval. A hidden portion 224 includes the other missing area/volume of content 220. In a media editing application, which allows snapping with the clip group content (e.g., objects), snapping for such objects may occur with the original bounding box 226 of the object 220 even though the object is partially hidden under the clipping mask. However, to allow the user of system 100 to be provided clear and concise functionality of snapping, the snapping to the hidden portion 224 may not trigger an alignment guide 228 to be shown if, for example, the user drags subject 230-A from a first location A to a second location B (e.g., illustrated by subject 230-B and arrow 232). Instead, system 100 may be configured to provide alignment guides and snapping functionality for visible portion 222 of object 220 while suppressing alignment guides, bounding boxes, and anchor points for hidden portion 224 if the user drags object 230-A near any of the hidden portion 224. This suppression of snapping to hidden portions is consistent with what a user may expect for hidden content. A bounding box in the visible portion 222 may be provided to enable snapping to portion 222 in or around [M] or [N], or a center of the visible portion 222. FIG. 2D depicts an example of what the user may be provided when the hidden portions of document content, objects, etc. are suppressed from being snapped to user-selected subjects.

FIG. 2D is an example user interface 200D illustrating an example alignment guide 234 associated with the partially visible content 222 of FIG. 2C. For clarity, the legend 250 is shown to differentiate the elements in the user interface 200D. Although only one content item (e.g., object) is depicted in the example, any number of vector graphics, objects, text, images, and/or other document content may be provided.

In the depicted example, a user may use an input device (not shown) to move a subject 236-A from a first location [A] to a second location [B] (e.g., subject 236-B), as indicated by arrow 237. When the subject 236-A is moved from the first location [A] to the second location [B], the alignment guide 234 is provided to indicate that snapping of the subject 236-B with clip group content (e.g., object 222) may occur to visible portions of clip group content (e.g., objects). Thus, alignment guides (e.g., alignment guide 234) may appear to assist a user to align subject 236-B with object 222 at or near [N] at anchor point 248, for example. Other alignment guides that snap to the entire object (e.g., content 220) are not shown because system 100 ensures that hidden portions of objects do not invoke alignment guides, anchor points, or snapping, in general to such hidden portions.

Other alignment guides may be displayed if, for example, the user were to move subject 236-A to other locations within user interface 200D. For example, if the user moves subject 236-A to a location shown by subject 236-C, an alignment guide 238 may appear to guide the user to snap subject 236-C to object 220 at [M] at anchor point 246, for example. Similarly, if the user moves subject 236-A to a location shown by subject 236-D, an alignment guide 240 may appear to guide the user to snap subject 236-D to object 220 at a center point anchor of the visible portion 222 of object 220.

In yet another example, if the user moves subject 236-A to a location shown by subject 236-E, an alignment guide 242 may appear to guide the user to snap subject 236-E to object 220 at an edge of a left hand side bounding box (not shown) for the visible portion 222 of object 220. In yet another example, if the user moves subject 236-A to a location shown by subject 236-F, an alignment guide 244 may appear to guide the user to snap subject 236-F to object 220 at either or both of anchor point 246 near [M] or anchor point 248 near [N], which may also represent an edge of a right hand side of bounding box (not shown) for the visible portion 222 of object 220. In some implementations, another alignment guide (not shown) may appear through anchor point 249, should a user move object 236-A near the center of object 222, for example.

Figure 3A:
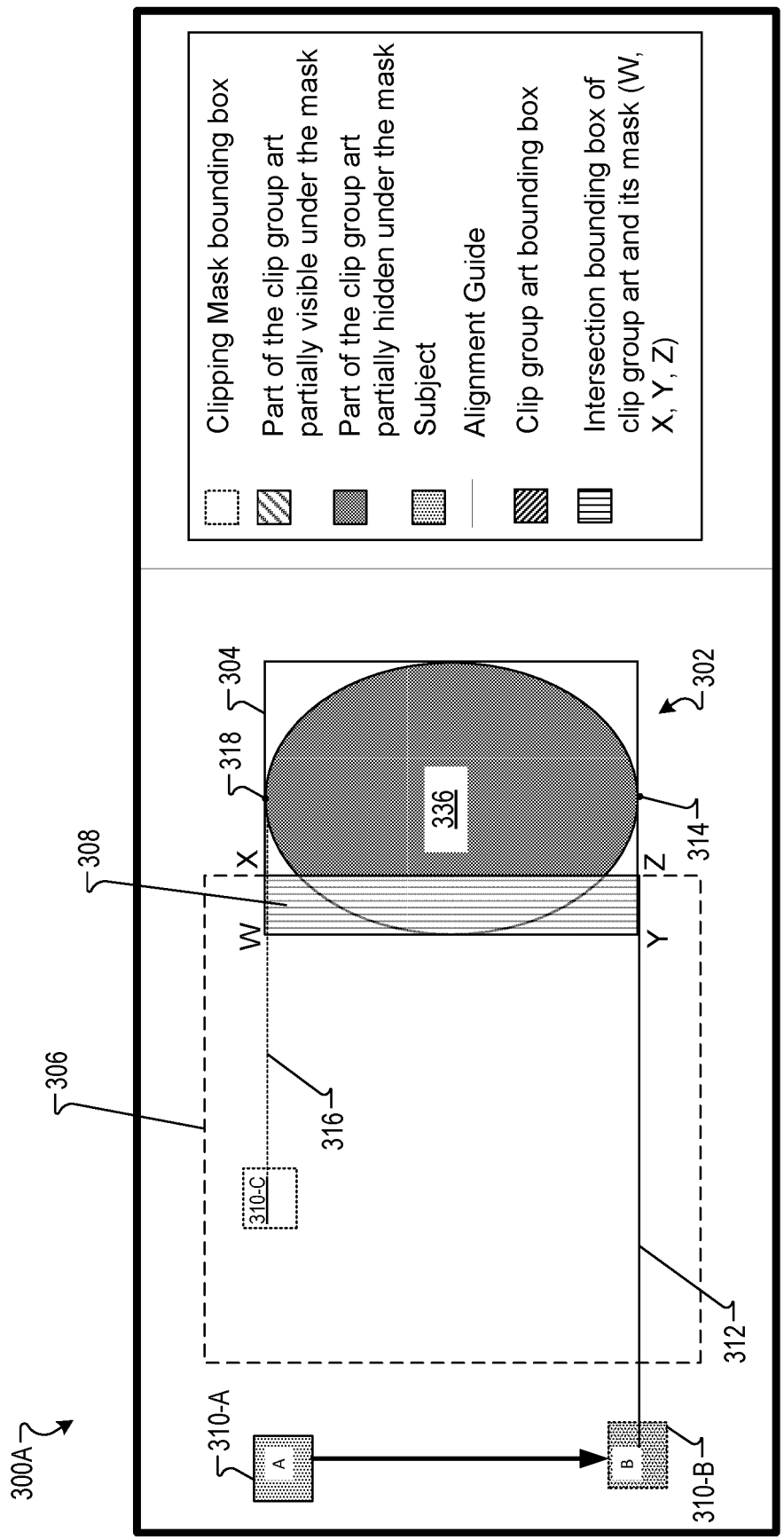
FIG. 3A is an example user interface illustrating an example of defining a bounding box.

FIG. 3A is an example user interface 300A illustrating an example of defining a bounding box. The user interface 300A depicts an object 302 with a defined bounding box 304 surrounding the entirety of object 302. Similarly, a clipping mask 306 is shown defining a clip group. Although only one object is depicted in the example, any number of vector graphics, objects, text, images, and/or other document content may be provided.

The system 100 may detect or determine the locations within the user interface 300A for both bounding box 304 and clipping mask 306. The system 100 may use graphics analysis system 110 to assess whether or not objects within interface 300A overlap, partially overlap or do not overlap. For example, the graphics analysis system 110 may determine whether any intersects occur between the bounding box 304 of object 302 and the bounding box of a clipping mask associated with content/objects in interface 300A.

In some implementations, the system 110 may retrieve a center location, a top left location, and a bottom right location for both bounding boxes 304 and 306 to form a modified bounding box 308 defined by a rectangle with points [W], [X], [Y], and [Z]. The modified bounding box may be used to generate updated anchor points and updated alignment guides for the object 302. Given the modified bounding box 308, a user may use an input device to move subject 310-A to a location shown by subject 310-B to trigger an alignment guide 312 to appear to guide the user to snap subject 310-B to object 302 at anchor point 314, for example. Similarly, if the user moves subject 310-A to a location shown by subject 310-C, an alignment guide 316 may appear to guide the user to snap subject 310-C to object 302 at anchor point 318.

In some implementations, the overlap of bounding boxes is used to determine which portions of an object are visible and which portions of the object are hidden (e.g., portions 336). In the example of FIG. 3A, the updated bounding box was generated for the portions of the object 302 that were determined to be visible.

In some implementations, determining intersections of boundary boxes is not accurate enough to combine certain vector graphics, shapes, text, images, and/or other document content. Thus, system 100 may also carry out additional techniques to find locations on objects in which to place precise anchor points that provide alignment guides that conform to a portion of a shape that is within the bounding box associated with the object, but not on a perimeter of the bounding box associated with the object.

Figure 3B:
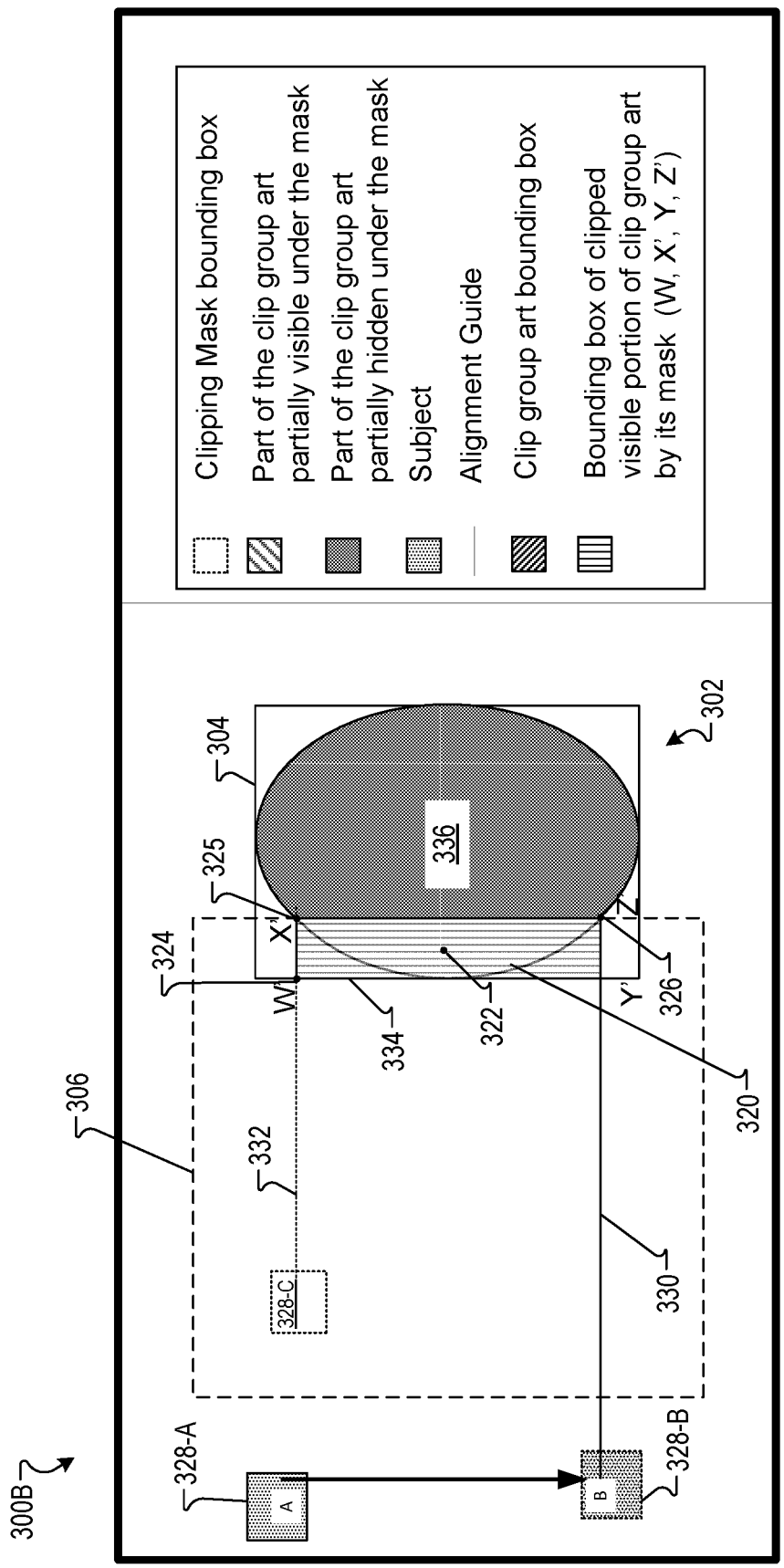
FIG. 3B is an example user interface illustrating an example of modifying the bounding box of FIG. 3A.

FIG. 3B is an example user interface illustrating an example of modifying the bounding box of FIG. 3A. The modified bounding box 320 may be generated using the bounding box 308 and further refining the coordinates of the bounding box 308 to generate a precise bounding box with particular points of interest that correlate to geometric areas on the object 302. For example, a center location 322, a top left location 324, and a bottom right location 326 may be determined. Each location may correlate to a visible portion of the object 302 within the clipping mask 306. At least some of the locations may be on a perimeter of the object 302 to assist a user with connecting (e.g., snapping) subjects to object 302. The bounding box 320 may be generated by finding intersections of the object 302 with the clipping mask 306. In this example, the intersection points are shown by [X'] anchor point at location 325 and [Z'] anchor point at location 326. In some implementations, other anchor points (e.g., [W] and [Y]) may also be updated to provide precise snapping of content, as shown in FIG. 3B by the movement of anchor points [W] and [Y] to updated corner points [W'] and [Y'].

In operation of system 100, a user may move an object 328-A to a location shown by object 328-B to trigger generation and display of an alignment guide 330 to assist the user in aligning and/or snapping the subject 328-B with an anchor point generated at location 326. Similarly, the user may move the object 328-A to a location shown by object 328-C to trigger generation and display of an alignment guide 332 to assist the user in aligning and/or snapping the subject 328-C with an anchor point generated at location 325.

Figure 4:
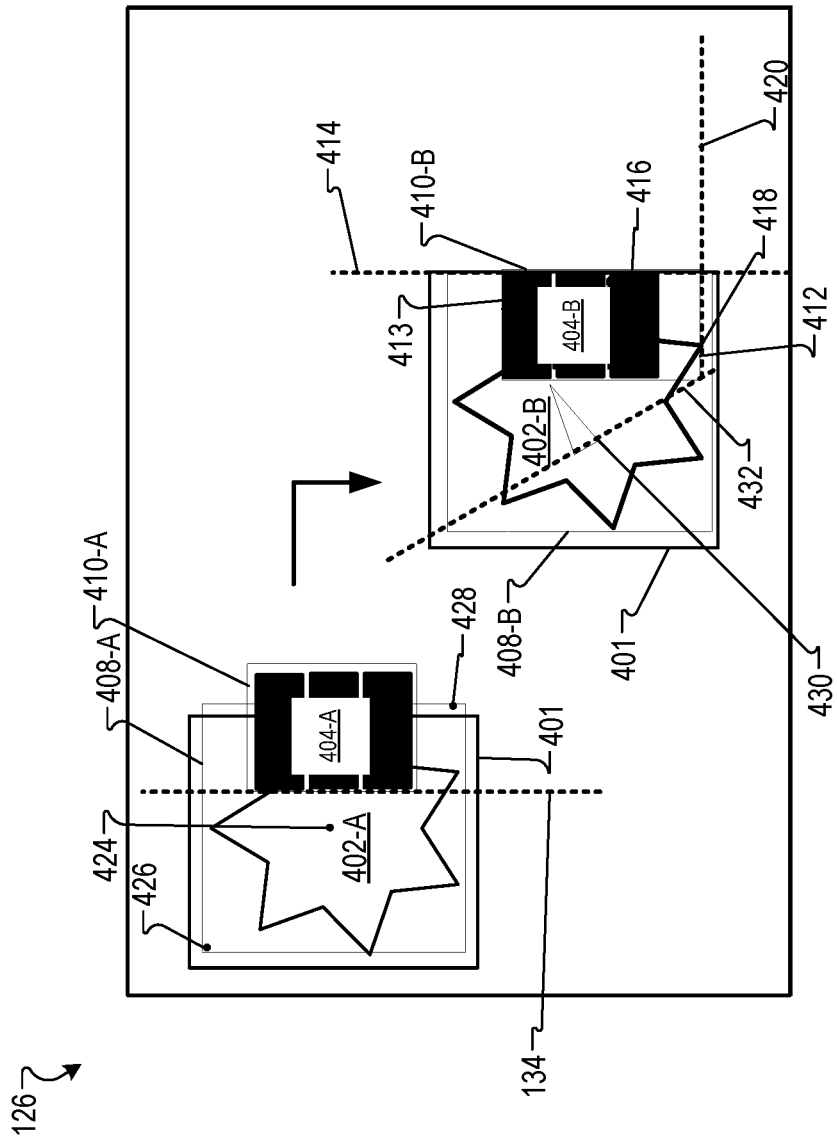
FIG. 4 is an example user interface illustrating an example of improving a snapping experience using clipping masks.

FIG. 4 is an example user interface 126 illustrating an example of improving a snapping experience with clipping masks. The user interface 126 may be generated in a media editing system (e.g., application) for arranging objects in an electronic document. The system may include (or have access to) a display device, at least one input device to move objects within the electronic document, at least one alignment control to control attraction of a plurality of anchor points associated with objects, at least one memory including instructions, and at least one processor that is operably coupled to the at least one memory and that is arranged and configured to execute instructions that, when executed, cause the at least one processor to carry out the algorithms, systems, and techniques described herein.

The system 100 may provide the objects in the user interface 126 of a digital media editor application and at least one of the objects may be defined by a clipping mask, such as a clipping mask 401 that is defined for object 402-A and a portion of subject 404-A. The object 402-A and the subject 404-A have been defined in the user interface 126.

The system 100 may utilize overlap and or intersection of bounding boxes and/or clipping masks to provide intelligent snapping of content. For example, the system 100 may determine the intersections when the system 100 receives from the input device, at least one input associated with a first object 402-A, 402-B. The at least one input may include selection and movement of the first object toward a second object (e.g., subject 404-A, 404-B).

The system 100 may identify, for the second object (e.g., subject 404-A), a bounding box 410-A that surrounds the second object (e.g., subject 404-A). The bounding box 410-A may define a plurality of anchor points configured to generate at least one alignment guide for the second object (e.g., subject 404-A). As shown, the object 402-A includes a bounding box 408-A. The subject 404-A includes a bounding box 410-A. When a user drags (e.g. moves) the subject 404-A near the object 402-A, the alignment guide 134 may be provided to align the subject bounding box 410-A to the bounding box 408-A of object 402-A. In this example, the user may instead wish to overlap the content (e.g., 402-A and 404-A) in an intelligent fashion such that portions of the object 402-A are overlapped with 404-A and portions of subject 404-A snap to portions of object 402-A.

For example, the system 100 may determine, for the subject 404-B, visible portions that are within a boundary associated with the clipping mask 401. In this example, the visible portions (represented as 404-B) include a portion of the three bars shown by subject 404-A. The system may then determine a number of points of interest in which at least one bounding box of subject 404-B intersects with the clipping mask 101. In this example, the intersection can be seen between clipping mask 401 and bounding box 410-A. However, the overlap may not coincide with points of interest that are on actual art within a clip group defined by the clipping mask 401. Since the user may wish to snap the object 402-A to the subject 404-A such that the subject 404-A concisely snaps to object 402-A at a point of interest, the system 100 may be configured to modify one or more of the bounding boxes associated with the object 402-A or the subject 404-A. An example of using the techniques described herein is now described with respect to objects 402-B and 404-B.

For example, the system 100 may determine that a point of interest exists at location 412 and can modify the bounding box 410-A to the size of bounding box 410-B to capture location 412 at the point of interest and to provide an anchor point and/or alignment guide 414 through the location 412. This results in defining a smaller bounding box 410-A than previous default bounding box 410-A to ensure that the user may snap to location 412 precisely at the clipping mask (clipping mask 101) boundary.

The user may then snap content directly to location 412. In effect, the modification includes reducing the at least one bounding box 410-A to terminate along at least one of the plurality of points of interest (e.g., location 412). In a similar fashion, additional bounding boxes may be generated for the same purpose, but for another defined edge of the bounding box 410-A/410-B. For example, the system may generate an additional change in bounding box 410-A or bounding box 408-A to include a point of interest 418 may benefit a user to snap content thereto. Thus alignment guide 420 may be provided if for example, the user moves the subject 404-B near the location 418 of object 402-B.

In some implementations, the system 100 may determine hidden portions that are located outside of the boundary defined by the clipping mask 401. The hidden portions may pertain to particular objects. The system may then disable, for each bounding box determined to include hidden portions of the objects anchor points that are associated with the hidden portions of the objects. In some implementations, disabling the anchor points that are located within the hidden portions includes changing a size of each bounding box that includes both visible portions and hidden portions to reduce an area covered by each respective bounding box. In some implementations, the system 100 may enable at least one anchor point for each of the plurality of points of interest in the visible portions and disable at least one anchor point based on the determined intersection of the clipping mask and the at least one bounding box.

In general, determining the plurality of points of interest includes determining, for each visible portion, a center anchor point 424, a top left anchor point 426, and a bottom right anchor point 428. The determined points of interest may be used as a basis to generate the modification of the at least one bounding box 408-A, 410-A, for example.

In general, the alignment guides (e.g., alignment guides 134, 414, and 420) are generated by alignment guide generator 118 by displaying a graphical line, in the user interface, that intersects at least one anchor point in the plurality of anchor points (or along a bounding box), in response to detecting a subject within a predetermined proximity of the at least one anchor point. The graphical line may be configured to align the subject 402-A, 404-B to other content (e.g., 402-B, 404-B) within the user interface 126 of the digital media editor (e.g., application 108) to allow linking of the subject to the other content at the at least one anchor point and/or bounding box edge.

In some implementations, the systems and techniques described herein may be used with a draw inside mode of media editing application 108. The draw inside mode may be used to specify locations inside of an object in which to draw. The draw inside mode allows a user to draw inside a single selected object, which may automatically generate a clipping mask from the selected object.

The systems described herein may enable media editing applications to identify content that may be visible beneath a clipping mask and enable snapping (e.g., via alignment guides and/or anchor points) with the visible content to improve efficiency and accuracy when users are interacting with the clipping mask. In addition, alignment guides may be configured in such applications to enable a draw inside mode, which allows users to precisely position objects within other objects (e.g., vector graphics). For example, the drawing in FIG. 4 depicts a triangle object 430 drawn inside another object 402-B. Rather than depict alignment guides with respect to the geometry of the original object 402-B, the system 100 can generate updated bounding boxes for particular objects to provide the user the ability to align a subject with content (e.g., object 430) within another object. This may provide an advantage to user to be able to precisely edit content with various positions of objects while working in the draw inside mode with the improved snapping experience provided by the algorithms described herein. For example, anchor points may be automatically generated by system 100 for objects inside other objects if, for example, system 100 detects locations of interest on objects that are within other objects. Similarly, alignment guides, such as guide 432, may be generated for objects within other objects. The algorithms described herein apply to the draw inside mode in the same fashion as objects that are not overlapped.

Figure 5:
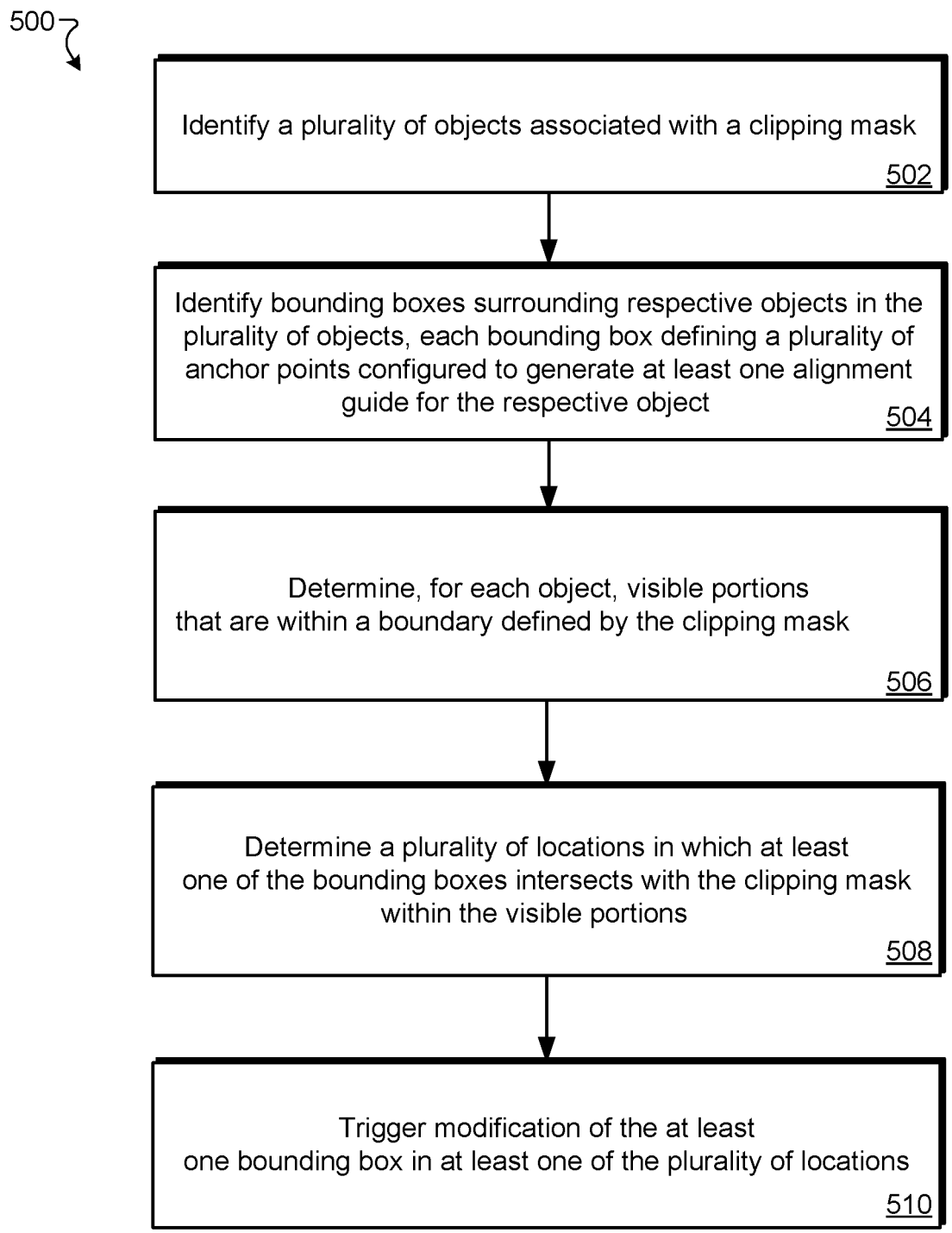
FIG. 5 is an example flowchart illustrating example operations of the system of FIG. 1.

FIG. 5 is an example flowchart illustrating an example process 500 performed by the system of FIG. 1. Process 500 may be performed by a system such as system 100 of FIG. 1. Process 500 takes objects (e.g., document content) and assesses locations in which anchor points, bounding boxes, and alignment guides may be provided to suit the depicted objects and a user interacting with the depicted objects. For example, the process 500 may improve the use of clipping masks, bounding boxes, and anchor points.

Process 500 may be performed by computing device 102, for example. The computing device 102 may include at least one memory 104 including instructions to carry out process 500 and at least one processor 106 that is operably coupled to the at least one memory 104 and that is arranged and configured to execute instructions that, when executed, cause the at least one processor to carry out the following steps. In general, the process 500 may utilize any combination of algorithms provided by the media editing application 108, the graphics analysis system 110, the clipping mask generator 112, the clip group generator 114, the anchor point generator 116, and/or the alignment guide generator 118.

Process 500 may begin by identifying a plurality of objects associated with a clipping mask and available for display in a user interface of a digital media editor (502). For example, the system 100 may provide objects for display in a user interface 126 of a digital media editor (e.g., via media editing application 108). The system 100 may use clipping masks to determine which particular objects can be snapped to (or which objects may generate alignment guides). The graphics analysis system 110 can identify objects associated with a particular clipping mask 122 by assessing which objects are clipped by particular clipping masks and/or clip group.

In general, alignment guides may be generated by the system 100 to display a graphical line, in the user interface, that intersects at least one anchor point (in a plurality of anchor points), in response to detecting a subject within a predetermined proximity of the at least one anchor point. The graphical line may be configured to align the subject to other content within the user interface of the digital media editor to allow linking of the subject to the other content at the at least one anchor point.

The process 500 may include identifying, for each of the plurality of objects, a bounding box surrounding a respective object in the plurality of objects (504). Each bounding box may define a plurality of anchor points configured to generate at least one alignment guide for the respective object. For example, the system 100 may identify the bounding box 211 surrounding object 202. In some implementations, identifying the bounding box of an object may include determining two or more points on a perimeter of a shape surrounding the entire object. In general, the bounding box may be configured to be selected in order to drag or move the object around in the user interface 126, for example. In some implementations, the bounding box may be a basis for providing anchor points and alignment guides to assist users in linking (snapping) subjects in the user interface 126 to the object.

The process 500 may include determining, for each object, visible portions that are within a boundary defined by the clipping mask (506). Determining visible portions may include using the graphics analysis system 100 to determine whether a particular clipping mask encompasses an entire object, a portion of the object, or none of the object. For example, if the system 100 determines that the clipping mask encompasses an entire object, the entire object is deemed as visible content and may be depicted to the user to attach to. In particular, any object that is deemed entirely visible may generate anchor points and alignment guides therefrom when a user moves a subject near the object. If the system 100 determines that a particular object is partially encompassed by the clipping mask, the portion of the object that is encompassed may be deemed visible and these visible portions will be enabled to provide anchor points and alignment guides in the user interface 126 when, for example, the user brings a subject near the partially encompassed object. If the system 100 determines that a particular object is not covered by the clipping mask (or within a defined clipping mask), the object may be deemed hidden. As such, anchor points and alignment guides may be suppressed for such an object.

The process 500 may include determining a plurality of locations in which at least one bounding box intersects with the clipping mask within the visible portions (508). For example, the system 100 may determine where a clipping mask 204 intersects with an object 220. The intersection point may define points of interest to the user since the clipping mask may be utilized as a tool for the user to indicate which portions and/or content in the user interface 200C, for example, that the user may be interested in editing. Here, the process 500 may use the intersection points to indicate a cutoff point for partially visible objects and hidden objects. The cutoff point may be used to generate bounding boxes for objects and partial objects so that a user is not inundated with extraneous anchor points and alignment guides that lead to hidden portions of the objects or entirely hidden objects. In particular, if the system 100 deems a portion as hidden, the system may suppress or disable anchor points and alignment guides from such hidden portions.

In some implementations, determining the plurality of locations may include determining, for each visible portion, a center anchor point, a top left anchor point, and a bottom right anchor point. Such locations may define a bounding box in order to determine overlapping portions of a clipping mask and the bounding box, both associated with a particular object. The determined plurality of locations may be used to generate the modification of the bounding box. For example, intersection points determined from the plurality of locations may be used to trigger modification of the bounding box associated with the particular object.

For example, the system 100 may determine hidden portions 224 (FIG. 2C) that are located outside of the boundary defined by the clipping mask 204. In response to determining such hidden portions 224, the system 100 may disable, for the bounding box 226 of the object, anchor points that are associated with the hidden portions 224. In some implementations, the system 100 may disable anchor points (and alignment guides) for each bounding box determined to include hidden portions of any of the plurality of objects associated with a particular user interface.

In some implementations, the system 100 may determine that at least one of the plurality of locations is located on a geographic feature represented in at least one of the plurality of objects (e.g., object 129-A and 129-B). For example, the system 100 may determine that geographic feature 132B may be a location of interest in which the user may be interested in snapping content thereto. Accordingly, the system 100 can trigger a determination of how to modify a bounding box associated with the object 129-B such that the user may easily receive an anchor point and/or alignment guide at the location of interest.

The system 500 may include triggering, in the user interface, modification of the at least one bounding box in at least one of the plurality of locations (510). The modification may include reducing the at least one bounding box to terminate on at least one of the plurality of locations. For example, the system 100 may determine the intersections (e.g., locations 325 and 326 in FIG. 3B) of the clipping mask 306 associated with the object 302 and the bounding box 304 associated with the object 302. The intersections may be deemed points of interest in which the user may wish to be provided anchor points and alignment guides therefrom. The system 100 may determine that a modified bounding box encompassing the visible portion of the object may be useful for the user. To generate the modified bounding box, the system 100 may use the intersection points 325 and 326 and an edge 334 of a visible portion of the object as a guide. In the depicted example of FIG. 3B, the visible portion of the object 302 intersects the clipping mask 306 in a location 325 that is lower than the original bounding box top location 304. Thus, the system 100 can modify the bounding box to provide a precise anchor point and/or alignment guide from point 325 instead of the top edge of bounding box 304.

In some implementations, the method 500 may include enabling at least one anchor point for each of the plurality of locations in the visible portions and disabling at least one anchor point based on the determined intersection of the clipping mask and the at least one bounding box. In some implementations, modifying the at least one bounding box 304 to become bounding box 320 may include removing snap-to functionality for the hidden portions 336 and suppressing display of alignment guides (e.g., 312 and 316 in FIG. 3A) associated the hidden portions 336 in the user interface. In some implementations, the system 100 may disable the anchor points e.g., anchor points 314 and 318 in FIG. 3A)) that are located within the hidden portions 336 to change a size of each bounding box 304 that includes both visible portions and hidden portions to reduce an area covered by each respective bounding box to a bounding box such as bounding box 320.

In some implementations, the method 500 may include disabling all anchor points and alignment guides associated with at least one object in the plurality of objects, in response to determining that the at least one object is undefined by the clipping mask. For example, the system 100 may determine that a number of objects available in a user interface of media editing application are not defined by a clipping mask and/or clip group that the user is working with. In response to determining the lack of association of the number of objects to the clipping mask or clip group, the system 100 may suppress extraneous graphical elements deemed to distract the user, for example. The extraneous elements may include anchor points or alignment guides that are not associated with the clipping mask or clip group of interest to the user.

The systems and methods described herein can be used in various tools. For example, the systems and methods can be used in any suitable digital media editor configured to edit vector drawings. Examples of digital media editor can include ADOBE® Illustrator, ADOBE® Photoshop, ADOBE® InDesign (all available from Adobe Systems, Inc. of San Jose, Calif.), or any other suitable digital media editor.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer (e.g., system 100) may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer (e.g., system 100) having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system (e.g., system 100) that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
identifying a plurality of objects associated with a clipping mask and available for display in a user interface of a digital media editor;
identifying, for each of the plurality of objects, a bounding box surrounding a respective object in the plurality of objects, each bounding box defining a plurality of anchor points configured to generate at least one alignment guide for the respective object;
determining, for each object, visible portions that are within a boundary defined by the clipping mask;
determining a plurality of locations in which at least one bounding box intersects with the clipping mask within the visible portions; and
triggering, in the user interface, modification of the at least one bounding box in at least one of the plurality of locations, the modification including reducing the at least one bounding box to terminate on at least one of the plurality of locations.

2. The method of claim 1, further comprising:
determining hidden portions that are located outside of the boundary defined by the clipping mask; and
disabling, for each bounding box determined to include hidden portions of the plurality of objects, anchor points that are associated with the hidden portions of the plurality of objects.

3. The method of claim 2, wherein disabling the anchor points that are located within the hidden portions includes changing a size of each bounding box that includes both visible portions and hidden portions to reduce an area covered by each respective bounding box.

4. The method of claim 2, further comprising, wherein modifying the at least one bounding box removes snap-to functionality for the hidden portions and suppresses display of alignment guides associated the hidden portions in the user interface.

5. The method of claim 1, wherein the at least one of the plurality of locations is located on a geographic feature represented in at least one of the plurality of objects and wherein the plurality of objects represent vector graphic art.

6. The method of claim 1, further comprising disabling all anchor points and alignment guides associated with at least one object in the plurality of objects, in response to determining that the at least one object is undefined by the clipping mask.

7. The method of claim 1, further comprising enabling at least one anchor point for each of the plurality of locations in the visible portions and disabling at least one anchor point based on the determined intersection of the clipping mask and the at least one bounding box.

8. The method of claim 1, wherein determining the plurality of locations includes determining, for each visible portion, a center anchor point, a top left anchor point, and a bottom right anchor point, and wherein the determined plurality of locations are used to generate the modification of the at least one bounding box.

9. The method of claim 1, wherein the at least one alignment guide is generated by displaying a graphical line, in the user interface, that intersects at least one anchor point in the plurality of anchor points, in response to detecting a subject within a predetermined proximity of the at least one anchor point, the graphical line configured to align the subject to other content within the user interface of the digital media editor to allow linking of the subject to the other content at the at least one anchor point.

10. A computer program product embodied on a non-transitory computer-readable storage medium and comprising an introspection network and instructions that, when executed by at least one computing device, is configured to cause the at least one computing device to:
   identify a plurality of objects associated with a clipping mask and available for display in a user interface of a digital media editor;
   identify, for each of the plurality of objects, a bounding box surrounding a respective object in the plurality of objects, each bounding box defining a plurality of anchor points configured to generate at least one alignment guide for the respective object;
   determine, for each object, visible portions that are within a boundary defined by the clipping mask;
   determine a plurality of locations in which at least one bounding box intersects with the clipping mask within the visible portions; and
   trigger, in the user interface, modification of the at least one bounding box in at least one of the plurality of locations, the modification including reducing the at least one bounding box to terminate on at least one of the plurality of locations.

11. The computer program product of claim 10, determining hidden portions that are located outside of the boundary defined by the clipping mask; and
   disabling, for each bounding box determined to include hidden portions of the plurality of objects, anchor points that are associated with the hidden portions of the plurality of objects.

12. The computer program product of claim 11, wherein disabling the anchor points that are located within the hidden portions includes changing a size of each bounding box that includes both visible portions and hidden portions to reduce an area covered by each respective bounding box.

13. The computer program product of claim 10, wherein the at least one of the plurality of locations is located on a geographic feature represented in at least one of the plurality of objects and wherein the plurality of objects represent vector graphic art.

14. The computer program product of claim 10, wherein determining the plurality of locations includes determining, for each visible portion, a center anchor point, a top left anchor point, and a bottom right anchor point, and wherein the determined plurality of locations are used to generate the modification of the at least one bounding box.

15. A media editing system for arranging objects in an electronic document, the system comprising:
   a display device;
   at least one input device to move objects within the electronic document;
   at least one alignment control to control attraction of a plurality of anchor points associated with objects;
   at least one memory including instructions; and
   at least one processor that is operably coupled to the at least one memory and that is arranged and configured to execute instructions that, when executed, cause the at least one processor to:
      provide the objects in a user interface of a digital media editor, wherein at least one of the objects is defined by a clipping mask;
      receive, from the input device, at least one input associated with a first object, the at least one input including selection and movement of the first object toward a second object;
      identifying, for the second object, a bounding box that surrounds the second object, the bounding box defining a plurality of anchor points configured to generate at least one alignment guide for the second object;
      determining, for the second object, visible portions of the second object that are within a boundary associated with the clipping mask;
      determining a plurality of points of interest in which at least one bounding box intersects with the clipping mask within the visible portions; and
      modifying the at least one bounding box in at least one of the plurality of points of interest, the modification including reducing the at least one bounding box to terminate on at least one of the plurality of points of interest.

16. The system of claim 15, further comprising:
   determining hidden portions that are located outside of the boundary defined by the clipping mask; and
   disabling, for each bounding box determined to include hidden portions of the objects, anchor points that are associated with the hidden portions of the objects, the objects being vector graphic art.

17. The system of claim 16, wherein disabling the anchor points that are located within the hidden portions includes changing a size of each bounding box that includes both visible portions and hidden portions to reduce an area covered by each respective bounding box.

18. The system of claim 16, further comprising enabling at least one anchor point for each of the plurality of points of interest in the visible portions and disabling at least one anchor point based on the determined intersection of the clipping mask and the at least one bounding box.

19. The system of claim 15, wherein determining the plurality of points of interest includes determining, for each visible portion, a center anchor point, a top left anchor point, and a bottom right anchor point, and wherein the determined points of interest are used to generate the modification of the at least one bounding box.

20. The system of claim 15, wherein the at least one alignment guide is generated by displaying a graphical line, in the user interface, that intersects at least one anchor point in the plurality of anchor points, in response to detecting a subject within a predetermined proximity of the at least one anchor point, the graphical line configured to align the subject to other content within the user interface of the digital media editor to allow linking of the subject to the other content at the at least one anchor point.

* * * * *